(12) United States Patent
Isaac-Lowry

(10) Patent No.: US 7,988,585 B2
(45) Date of Patent: Aug. 2, 2011

(54) KIT TO CONVERT AN OPEN DIFFERENTIAL TO A LIMITED SLIP DIFFERENTIAL

(75) Inventor: Oran Jacob Isaac-Lowry, Lexington, KY (US)

(73) Assignee: Nivel Parts and Manufacturing Co., LLC, Jacksonville, FL (US)

( * ) Notice: Subject to any disclaimer, the term of this patent is extended or adjusted under 35 U.S.C. 154(b) by 763 days.

(21) Appl. No.: 11/842,978

(22) Filed: Aug. 22, 2007

(65) Prior Publication Data

US 2009/0093334 A1    Apr. 9, 2009

(51) Int. Cl.
*F16H 48/20* (2006.01)

(52) U.S. Cl. .................. 475/241; 475/234; 475/235

(58) Field of Classification Search .............. 475/230, 475/231, 234, 235, 236, 241
See application file for complete search history.

(56) References Cited

U.S. PATENT DOCUMENTS

| | | | | |
|---|---|---|---|---|
| 5,045,038 A | * | 9/1991 | Sherlock | 475/235 |
| 5,055,095 A | * | 10/1991 | Osenbaugh et al. | 475/233 |
| 5,919,110 A | * | 7/1999 | Deese | 475/231 |
| 6,354,979 B1 | * | 3/2002 | Lohr | 475/240 |

* cited by examiner

*Primary Examiner* — Ha D. Ho
(74) *Attorney, Agent, or Firm* — James M. Francis; Greenebaum Doll & McDonald PLLC

(57) ABSTRACT

Disclosed is a kit which enables the rapid conversion of an open differential gear assembly in a golf cart to a limited slip differential gear assembly by replacing the side gears with side gears containing an integrated clutch surface that engage a double wound spring loaded case containing an integrated clutch surface that transmits power away from the slipping wheel and to the wheel having traction.

14 Claims, 3 Drawing Sheets

KIT TO CONVERT AN OPEN DIFFERENTIAL TO A LIMITED SLIP DIFFERENTIAL

BACKGROUND OF THE INVENTION

1. Field of the Invention

This invention relates generally to limited slip differential gear assemblies used in transportation. More particularly, this invention relates to devices and kits to facilitate conversion of an open differential into a limited slip differential.

2. Problems in the Art

Wheels placed on opposing ends of power transmitting axles spin at different speeds during turns due to the longer path the outer wheel must travel during the turn while both wheels stay connected. The inner wheel must, by necessity, travel at a slower speed than the outside wheel.

Without a differential, the wheels connected to the powered axle would have to be locked together which would result in one wheel slipping in order to keep up with the other wheel. This would result in enormous strain on the power-train and would also result in an uncomfortable ride as one wheel slipped its way through the turn. The differential is designed to split the torque generated by the engine and transmitted through the power-train to the driven axle.

The simplest form of differential is the open, or conventional, differential. The wheels in this differential setup spin at different rates due to the fact that the axle is decoupled from the ring gear which transfers power from the pinion shaft to the wheels. Pinion gears (spider gears) are affixed to and turn with the ring gear. The axle is bifurcated and side gears are affixed to the internal ends of the bifurcated axle. The axle is re-coupled by seating the side gears into the spider gears, which lie in a perpendicular plane to the side gears. As the ring gear, which lies perpendicular to the axle, and affixed spider gears rotate around the axis of the axle due to the transfer of force from the pinion shaft, the spider gears distribute the power to the bifurcated axle sections. Since the spider gears engage the side gears so that the two side gears do not have to rotate at the same speed, the two wheels can thus turn at different rates without placing undue stress on the power-train. The downside is that the open differential always applies the same torque to both wheels. The maximum amount of torque is limited to that which will not make the wheels slip. Thus, when one wheel has no or little traction, very little torque is applied to the wheel with traction.

Limited slip differentials (LSD) were designed to limit the velocity difference between a pair of driven wheels, allowing torque to be transmitted as long as one of the two wheels has traction. The two main types of LSD are the torque sensitive (geared or clutch based) and speed sensitive (viscous coupling and clutch pack).

The torque sensitive clutch-type LSD is similar to the open differential but adds a spring pack and a set of clutch discs that are evenly divided between the two wheels. The springs push the side gears against the clutch discs. The clutch discs are in turn attached to the cage of the ring gear. The stiffness of the springs combined with the friction produced by the clutch disc on the cage keeps the wheels turning at the same rate and supplies equal torque to both wheels. The torque supplied to the slower moving wheel is equal to the amount of torque it takes to overpower the clutch disc and partially decouple the faster moving wheel from the power-train.

Limited slip differentials have become standard on off-road vehicles and high performance sports cars that are designed to handle hard cornering where one wheel may be slightly higher than the other. Golf carts often leave cart paths and become subjected to terrain that can leave one wheel off of the ground, or at least in less contact with the ground than the other driven wheel. Most golf carts have been and continue to be manufactured with open differentials. In many instances, it would be beneficial to convert an existing open differential on a golf cart into a limited slip differential.

An additional benefit of developing a successful means of wheel to wheel torque transfer is evident under braking. Since an open differential will allow the wheels to rotate at any given independent velocity, during hard braking one wheel will lock up before the other causing a dangerously unstable vehicle condition. On flat ground, this makes braking dramatically less effective and can cause the vehicle to spin out of control. When going downhill, this will cause the vehicle to "lose the brakes" and accelerate out of control or cause the vehicle to spin and potentially flip.

SUMMARY OF THE INVENTION

The present invention is a kit and method for using the kit to convert a conventional open differential from an original equipment manufacturer (OEM) found in golf carts into a limited slip differential. The kit is comprised of 2 body halves, 4 high-load springs, 2 clutch rings, and 2 male side gears with integrated clutch surfaces and oil grooves.

The components included in the kit install into an existing open OEM differential. The included side gears replace the existing factory side gears. The case halves install into the differential by fitting around the spider gear (pinion gear) cross pin and have the friction surfaces mating onto the side gears. The high load springs fit into machined pockets in the case halves and provide the clamp load for the friction surfaces onto the gear faces.

By using the force developed between the friction surfaces and the machined side gears the system can transfer torque between the two side gears. When the tractionless wheel begins to spin, the difference in rotational speeds between the two side gears now causes shearing across the friction surfaces on both sides of the LSD unit. The unit acts as a brake on the wheel that is spinning and transfers the absorbed energy to the stationary side gear. The unit simultaneously acts like a clutch to accelerate the stationary gear. The end result is that the stationary wheel now has enough power to move the vehicle.

Each component is designed to attain the maximum possible amount of torque transfer and system longevity. The high load springs are dual wound to increase clamp load without increasing physical size, the friction material is designed to function in high viscosity oil and remain stable at high temperatures, the case halves possess reliefs, or clutch ring grooves, to allow for a thicker clutch ring to increase the longevity of the wear components, the side gears are back cut to create a circular raised surface on each that is textured to increase the coefficient of friction between the gear crown and the clutch material, and the surface is scored with oil control grooves extending radially from the center of the raised surface to discourage the formation of an oil film between the mating surface and the clutch material by facilitating the flow of oil away from the joint created between the gear crown and clutch material.

The total amount of torque the present invention can transfer is not a function of input torque, i.e. the power output of the engine or motor; instead the total torque transfer is a function of the reflected torque from each wheel at the differential. In this case, reflected torque is how much torque the Present invention "senses" is required to turn each wheel at any given time. This "sensed" torque value is dependent largely on the traction capability of each tire. Thus the overall effectiveness of the invention is not dependent on the power output of the motor or engine. Therefore the kit can be used on any vehicle generating any amount of drive power.

The total amount of torque transferred by the present invention is also proportional to the difference in velocities of the side gears. As one gear spins faster than the other, the amount of torque transferred to the stationary wheel increases. Because of this design consideration, there are no unpleasant side effects, such as gear chattering or vibration, from the unit during normal turning. When the vehicle enters a turn, the relative velocities between the gears remains low enough the that torque transfer from wheel to wheel is not strong enough to cause the bucking or jerking commonly associated with a solid or locked differential.

The small size of golf car differentials necessitates a unique approach to developing a limited slip differential. Due to the physical size and shape of the various components the principles and design of existing LSD models cannot simply be scaled down to work properly. Also due to the small size of the OEM differential, some larger LSD designs cannot be feasibly scaled down due to the large cost and reliability issues of manufacturing very small complex components.

Due to the nature of the design of the LSD Conversion Kit, it can be applied to any differential of any size and shape from automotive to radio controlled cars. By adjusting the friction material and spring rate, the torque transfer capability can be tailored to literally any application. Additional applications that could benefit from limited slip differentials such as motorized wheel-chairs, go karts, and similar small transportation devices.

DETAILED DESCRIPTION OF THE DRAWINGS

Figure 1:
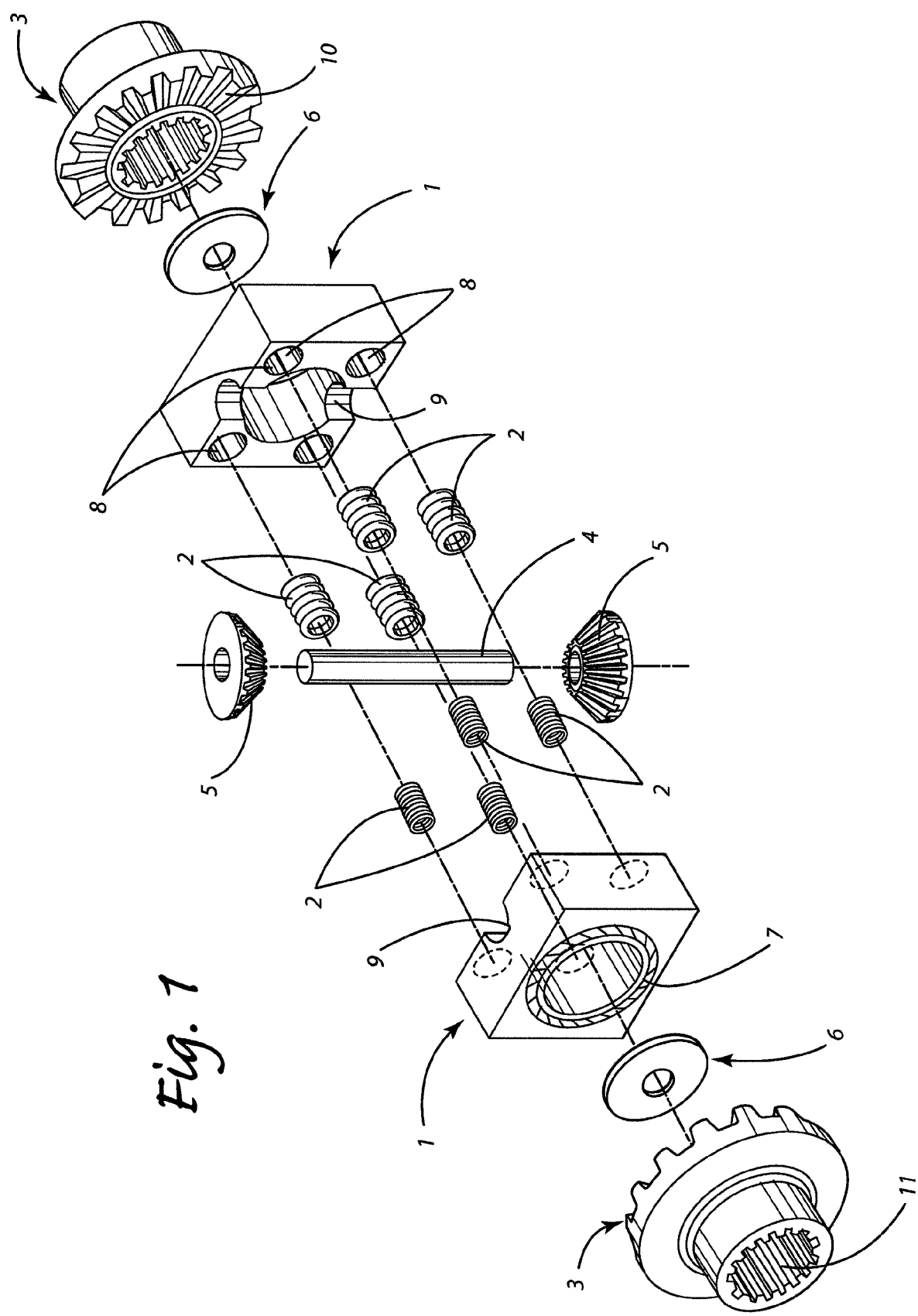
FIG. 1 depicts an exploded view of the device.
Figure 2:
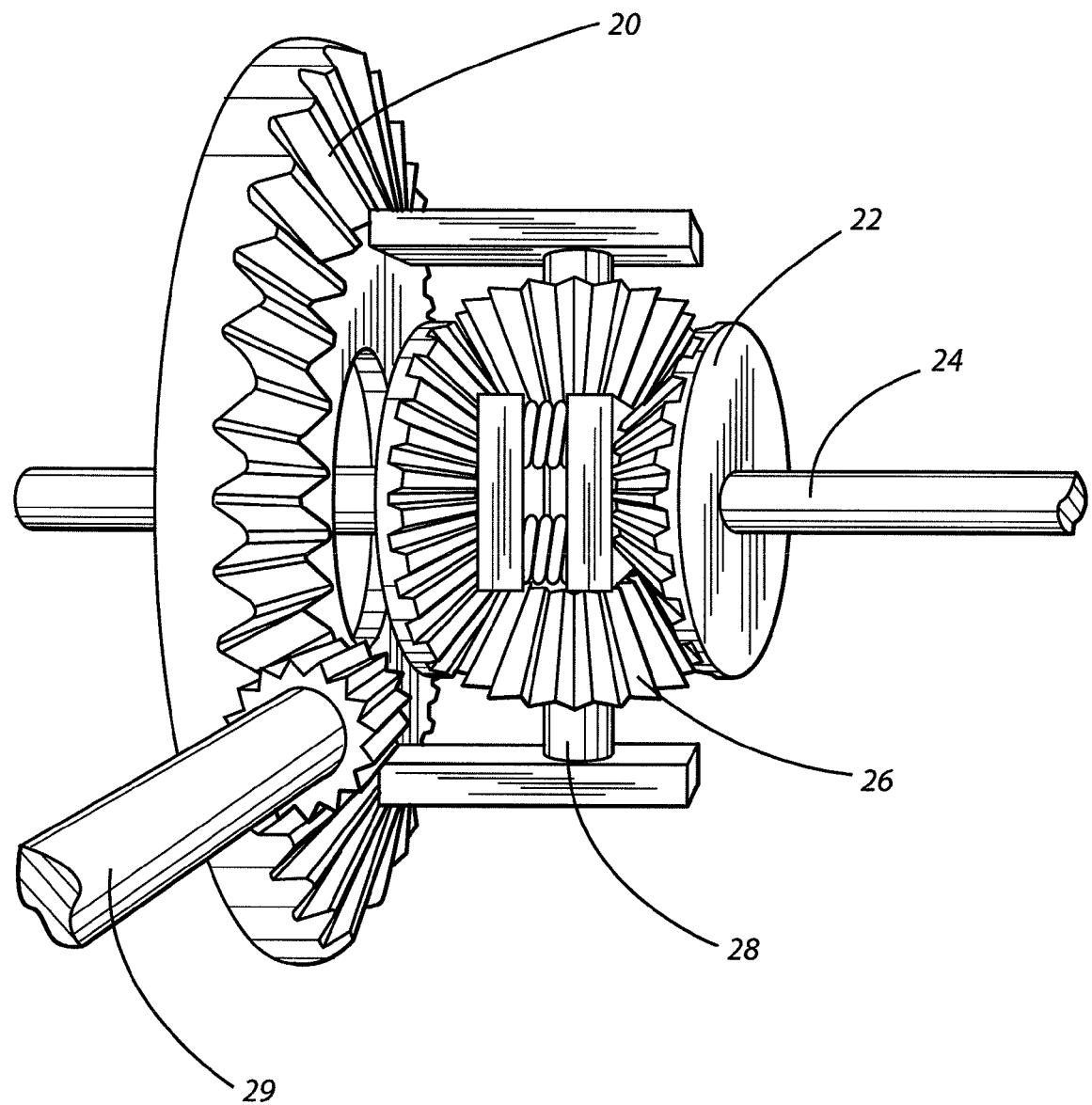
FIG. 2 depicts a side perspective view of the assembled device.

FIG. 1 depicts and exploded view of the present invention. The device is preferably comprised of two case halves 1, two clutch rings 7, four dual wound load springs 2, and two side gears 3. Each case half 1 possesses an outer face 1a and an inner face 1b. The outer face 1a engages the side gears 3 while the inner face 1b opposes the inner face 1b of the other case half 1. Four spring seats 8 are present in each case half 1 and oppose the other case half's 1 spring seats 8. A cross pin groove 9 passes lengthwise through the center of the inner face 1b of each case half 1 as semi-circular grooves. Each case half 1 also possesses a circular central orifice 15 which runs from the inner face 1b to the outer face 1a. The outer face 1a of each case half 1 possesses a clutch ring seat groove 13.

Circular clutch rings 7 shaped like washers are seated within each case half's 1 clutch ring seat groove 13. The clutch rings 7 are typically made of materials similar or identical to materials used in the manufacture of brake pads, i.e. polyparaphenylene terephthalamide fibers, ceramic fibers or similar materials with a high coefficient of friction. Ideally the clutch material possesses a constant friction coefficient at varying temperatures, Minimum friction coefficient, minimum judder tendency, high burst strength, and high wear resistance of the facing and minimum abrasion of mating surfaces.

The clutch ring 7 thickness is substantially three times the depth of the clutch ring groove 13. The clutch rings 7 interact with the side gears 3 along their mating surface 32. The mating surface 32 of the side gear 3 preferably possesses oil control slots 36 and is textured to increase its coefficient of friction. The side gear 3 possesses a circular channel 11 along its axis. The side gear channel 11 preferably possesses teeth 17 running lengthwise through the channel and which interact with the teeth on the end of an axle shaft.

Dual wound springs 2 are utilized to sustain the required load in the small space in which the device is installed. A smaller, nested inner spring 42 is placed within the interior of a larger outer spring 44 to enhance its load bearing capacity. The springs are placed within the corresponding spring seats 8 of both case halves 1 and compressed between the case halves 1 as the device is placed within the differential. The inclusion of four sets of dual wound springs 8 in parallel gives the combined effect of eight springs mounted in parallel supporting the same load. The springs 8 are pre-loaded by forcing the two case halves 1 together prior to placement within the subject differential.

The size of the case halves 1 and machined side gears 3 depends upon the size of the void that can be occupied. A golf cart, for example, would utilize a case half 1 that is substantially fifty-five millimeters long by thirty-nine millimeters wide by ten millimeters high. The diameter of the spring seats 8 in a device designed for a golf cart would preferably be substantially fifteen millimeters with a depth of substantially eight millimeters while utilizing springs that are approximately twenty millimeters long with diameters of fifteen millimeters for the outer spring 44 which preferably possesses six coils, and nine millimeters for the inner spring 42 which preferably possesses ten coils.

Figure 3:
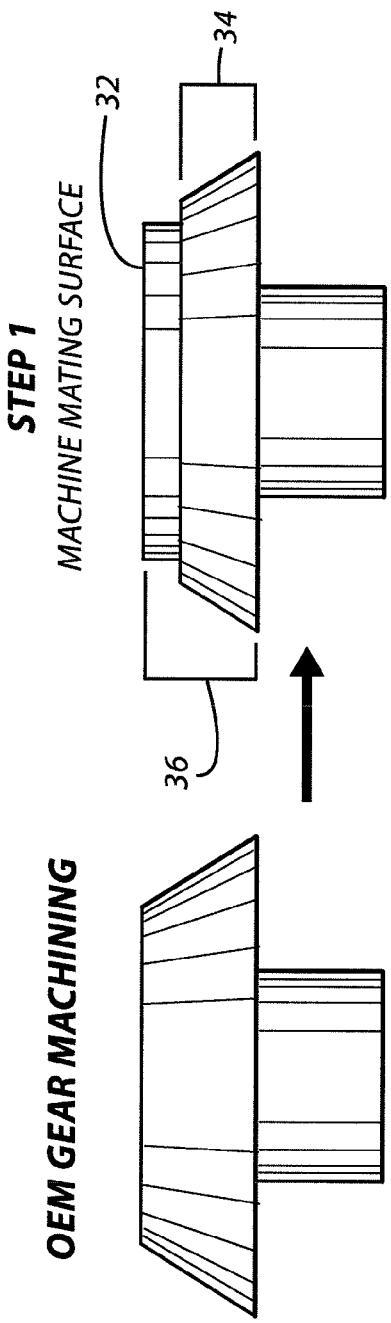
FIG. 3 depicts a side profile of a machined side gear.
Figure 4:
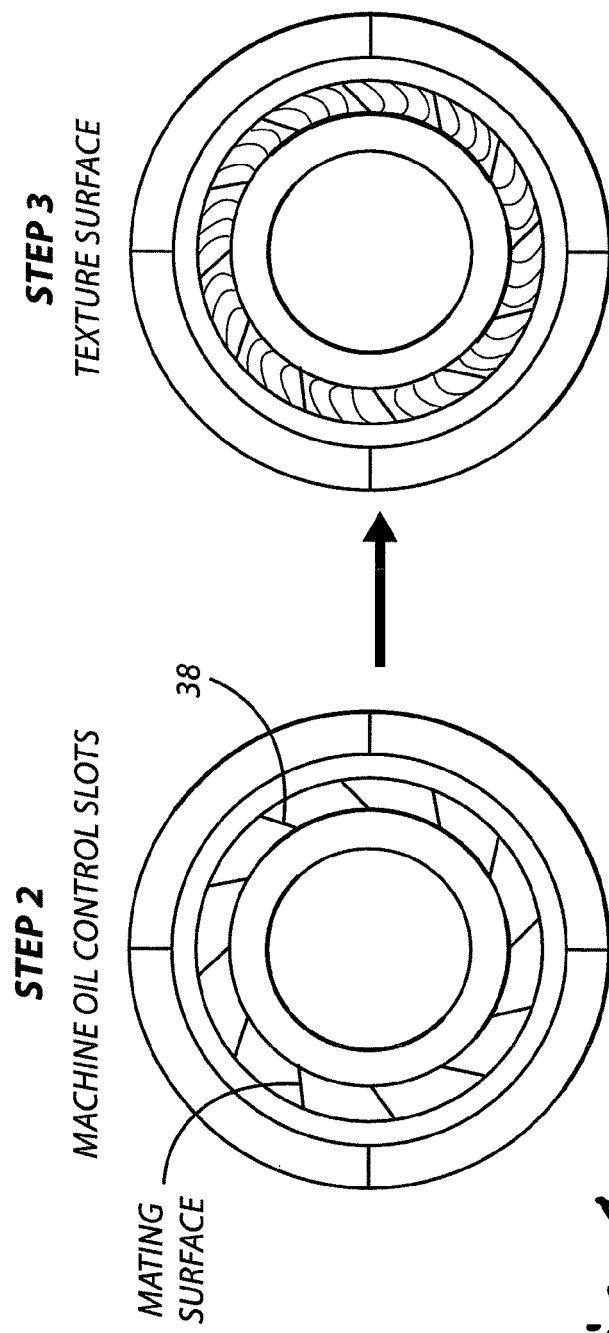
FIG. 4 depicts a top-down perspective view of a side gear.

As depicted in FIGS. 3 and 4, the machined side gears 3 are unique in that their gear teeth 34 are cut back and the crown 36 of the side gear is machined into a substantially flat, wearable surface so as to create a plateau-like mating surface 32 that engages the clutch ring 7. The mating surface 32 wears against the clutch ring 7 it is engaged with and separates the gear teeth 34 from the high temperature and high friction environment that includes the mating surface 32 and clutch ring 7. The mating surface 32 and clutch ring 7 will both wear throughout the service life of the differential, eventually requiring replacement of the clutch ring 7 first and eventually the side gear 3 which can be replaced or potentially re-machined. The mating surface 32 is modified by cutting oil control grooves 38 into the surface so as to facilitate the flow of oil away from the joint created by the coupling of the mating surface 32 and the clutch ring 7. The mating surface 32 is further modified by machining a texture into the surface while still maintaining the integrity of the oil control grooves 38.

What is claimed is:
1. A kit for converting an open differential into a limited slip differential comprising:
(a) at least two clutch pads rings;
(b) a substantially cuboidal case comprised of two halves having an inner face and an outer face, each said case half possessing two corresponding semicircular arced spider gear cross shaft grooves that permit a cross shaft to pass through said case when said case halves are mated, recessed spring seats in the inner face of each case half, and a clutch ring groove in said outer face of each said case half and in which one said clutch ring is seated;
(c) at least two dual wound compression springs, each said dual wound compression spring having an inner spring and an outer spring; and

(d) two male side gears, said side gears possessing a raised integrated clutch surface.

2. The kit of claim 1, wherein said integrated clutch surface possesses oil control grooves.

3. The kit of claim 2, wherein said oil control grooves are cut in a substantially radial pattern away from the center of said integrated clutch surface.

4. The kit of claim 1, wherein said integrated clutch surface is a textured so as to increase the coefficient of friction.

5. The kit of claim 1, wherein said case is comprised of materials selected from the group consisting of iron, steel, aluminum, brass, bronze, and copper.

6. The kit of claim 1, wherein said case is comprised of ceramic.

7. The kit of claim 1, wherein said side gears are comprised of materials selected from the group consisting of iron, steel, and bronze.

8. The kit of claim 1, wherein said inner spring is comprised of a smaller gauge spring coil wire than said outer spring.

9. The kit of claim 2, wherein said inner spring possesses more coils than said outer spring.

10. The kit of claim 8, wherein four dual wound springs utilized.

11. The kit of claim 1, wherein said clutch ring thickness is substantially three times the depth of said clutch ring groove.

12. The kit of claim 11, wherein said clutch rings are comprised of a composite containing ceramic fibers.

13. The kit of claim 11, wherein said clutch rings are comprised of a composite containing polyparaphenylene terephthalamide fibers.

14. The kit of claim 11, wherein said clutch rings are comprised of a semi-metallic composite.

* * * * *